(12) United States Patent
Jagannathan

(10) Patent No.: US 8,247,751 B2
(45) Date of Patent: Aug. 21, 2012

(54) MICROWAVE PRESSURE COOKER

(75) Inventor: Tiruvallur Thatai Jagannathan, Bangalore (IN)

(73) Assignee: TTK Prestige Limited (IN)

( * ) Notice: Subject to any disclaimer, the term of this patent is extended or adjusted under 35 U.S.C. 154(b) by 246 days.

(21) Appl. No.: 12/809,746

(22) PCT Filed: Feb. 22, 2010

(86) PCT No.: PCT/IN2010/000102
§ 371 (c)(1),
(2), (4) Date: Jun. 21, 2010

(87) PCT Pub. No.: WO2011/083486
PCT Pub. Date: Jul. 14, 2011

(65) Prior Publication Data
US 2011/0259881 A1 Oct. 27, 2011

(30) Foreign Application Priority Data
Jan. 7, 2010 (IN) ................ 46/CHE/2010

(51) Int. Cl.
*H05B 6/80* (2006.01)

(52) U.S. Cl. ............... 219/735; 219/734

(58) Field of Classification Search ........... 219/678, 219/725, 734, 735; 426/118, 234; 200/367.1
See application file for complete search history.

(56) References Cited

U.S. PATENT DOCUMENTS

| 4,490,597 | A | * | 12/1984 | Mengel ............ 219/735 |
| 4,796,776 | A | | 1/1989 | Dalquist et al. |
| 4,853,509 | A | | 8/1989 | Murakami |
| 5,229,563 | A | | 7/1993 | Isogai et al. |
| 5,310,981 | A | | 5/1994 | Sarnoff et al. |
| 2002/0040906 | A1 | | 4/2002 | Hakim |

FOREIGN PATENT DOCUMENTS
WO 2007/122648 A1 11/2007
WO 2010/049942 A1 5/2010

OTHER PUBLICATIONS
International Search Report, PCT/IN2010/000102, dated Nov. 15, 2010.

* cited by examiner

*Primary Examiner* — Quoc Hoang
(74) *Attorney, Agent, or Firm* — Lerner, David, Littenberg, Krumholz & Mentlik, LLP

(57) ABSTRACT

The invention relates to a microwave pressure cooker including a container open at its top which includes a cover with a gasket adapted for ledge interlock type sealing and lug locking engagement with the container. There are two regulator opening means provided as valve opening through the cover (2) such that one of the deformable diaphragm type pressure regulator means formed are disposed on these regulator opening means which deform responsive to the pressure in the enclosure. A push rod type gasket offset device means is also provided on locking lug and opening and closing aid of the cover for releasably maintaining the container and the cover in sealing engagement. Further a filter is disposed removably on the first regulator opening means, which controls the pressure building within the enclosure.

24 Claims, 16 Drawing Sheets

MICROWAVE PRESSURE COOKER

CROSS-REFERENCE TO RELATED APPLICATIONS

The present application is a national phase entry under 35 U.S.C. §371 of International Application No. PCT/IN2010/000102, filed Feb. 22, 2010, which claims the benefit of Indian Patent Application No. 46/CHE/2010, filed Jan. 7, 2010. The disclosures of said applications are incorporated by reference herein.

FIELD OF THE INVENTION

The present invention in general relates to the microwave compatible cooking system to be used as home appliance for cooking foods and it more specifically relates to pressure cooking system to be used inside a microwave oven for cooking food containing steam at a pressure above the ambient pressure. The microwave pressure cooker described in this invention can be used to cook foods in various situations for domestic pressure cooking. This is a complete self contained system that can be used with any microwave oven provided with a chamber large enough to accommodate it.

BACKGROUND OF THE INVENTION

Microwave ovens use microwave energy to heat or cook food in a fraction of the time needed to cook with conventional ovens. Unlike conventional ovens, a microwave oven heats food without applying the external heat i.e. any flame or direct heat sources. The microwaves readily pass through many materials, such as glass, most plastics, paper and china clay, with little or no effect. Generally, these materials are used for making utensils which can be used for cooking in a microwave oven.

In microwave cooking, the metal utensils do not allow penetration of microwaves to generate the heat energy required for cooking the food, and thereby cooking efficiency is greatly reduced. Further there is also possibilities of damage for the microwave oven due to the arc formation between the metallic utensils and the door of the oven and may also results in the discoloring of cooking food which leads to a hygienic problem.

Nowadays the use of number of microwave oven in public has grown at very high rate. There has been an increase in demand for specially designed and configured cooking vessels for use in microwave ovens to provide easy and convenient way of preparing foods in microwave ovens. Many attempts have been made in the manufacture of various types of cooking vessels, casserole dishes, various types of bowls, pressure cookers for microwave and the like, to be compatible with use in microwave ovens.

U.S. Pat. No. 4,796,776 discloses a pressure cooker for use in microwave ovens includes a microwave permeable bowl-shaped container, a microwave permeable dome cover, and a steel locking ring permanently attached to the cover for maintaining the container and cover in fluid-tight seal during use. A safety valve, formed of flexible tubing, encounters a projection of the container and is deformed into a closed configuration responsive to movement of the cover, relative to the container, toward a locking position. A pressure regulator valve, consisting of a metal core surrounded by an elastically deformable casing, which is positioned over a pressure control opening in the cover to maintain a selected operating pressure level in the pressure cooker.

U.S. Pat. No. 4,853,509 discloses a rice cooker for preparation of shaped foods of rice in a microwave range is made of microwave permeable synthetic resin such as polypropylene and internally provided with mutually separate confined spaces of a fixed capacity and adapted for accommodating rice with water. As the rice cooker containing uncooked rice with water is heated in the microwave range, compression acts on the boiled rice due to pressure contact of the boiled rice swelled and water with walls defining the spaces and the boiled water is automatically shaped in the spaces. Absence of direct contact of the rice with user's hand during the process enables preparation of shaped foods of rice such as rice balls without any keen pain and blemish on the hands.

U.S. Pat. No. 5,229,563 discloses a pressure cooker and a process for making the same, wherein the pressure cooker includes a pressure container for accommodating food to be cooked, a cover for covering the container in an air-tight manner, a pressure control device for adjusting the internal pressure in the container. The container or the cover or both are partly or wholly made of a composite resin consisting essentially of polyphenylene sulfide resin and 30 wt. % to 50 wt. % glass fiber.

U.S. Pat. No. 5,310,981 discloses a microwave cooker capable of cooking an assortment of foods by a variety of methods while maintaining constant pressure. This pressure cooker boils and steams foods continuously without pressure build up and without the need to shut off the microwave oven. Food spattering and spillage are prevented by a unique internal baffle rib design and a mechanism that releaseably locks the top cover. The top cover and inner cover of the pressure cooker have the same outer diameter and each have a plurality of vent holes or apertures. Both the top cover and inner cover are positioned within container and each have a skirted edge. The skirted edges form an enclosure within the container member, specifically designed to obstruct and contain escaping food particles.

The existing microwave pressure cookers have metal parts for restraining structural changes. Moreover they have metal based deadweight pressure control systems. It is advisable to restrict the use of metallic materials inside microwave ovens because metals reflect microwave and modify the pattern of microwave distribution within the microwave chamber.

In addition, any sharp projections in the metal parts arising out of normal handling during the lifetime of the cooker can cause sparking in the chamber.

Further, the mechanical attachment between the metal parts and the polymeric parts is not perfect. This can lead to loosening of the said parts during the repeated thermal cycling which is common in normal use.

Existing microwave pressure cookers have various metallic parts like the use of metal based dead weight pressure regulators assembly, metal locking ring, metal latching members etc. Further they also permit emission of foamy liquid into the microwave chamber when froth generating foods are cooked.

In most of the prior art, the pressure cookers for microwave oven which either partially or wholly describes the apparatus of cooking system comprising container and cover that have been constructed using microwave compatible material. Further many attempts have been made in prior art to achieve a microwave compatible pressure cooking system, but still suffers from drawbacks of using some metallic parts like metal springs, metallic ring, metallic core for dead weight pressure regulating system etc., which are more dangerous and have disadvantages.

BRIEF SUMMARY OF THE INVENTION

The primary object of the present invention is to provide a pressure cooker system comprising of sub-assemblies, all of which are designed to be compatible with microwave energy, provided with all required safety features for microwave cooking.

Further, the object of the invention is to provide a lightweight, simple and attractive microwave compatible pressure cooker embedded with safety devices prescribed in appropriate standards.

It is another object of the invention to provide a simple, attractive and light weight pressure cooker in which all parts and subassemblies are made up of materials that is compatible with microwave oven.

It is another object of the invention to provide a pressure cooker with an improved pressure regulating safety device made of elastomeric material without the use of metallic parts and conventional dead weight device for regulating the pressure developed inside the cooker. It is attempted herein to provide a pressure cooker with an improved visual pressure indicating device made of elastomeric material without the use of metallic parts for indicating the pressure that developed inside the cooker. Yet another feature in the present invention is that it is provided with a specially designed visual pressure indicator which is capable of regulating pressure when the cooker is under pressure and which also relieves the excess pressure in case of any contingency leading to the pressure inside increasing abnormally beyond the designed operating pressure.

It is further object of the present invention to provide a receptacle in the central portion of the cover of pressure cooker provided with a removable receptacle cover to prevent the spattering of the froth of the cooking food along with vapor when the excess pressure from the cooker is ejected out during cooking operation.

It is further object of the present invention to provide a gasket offset device which works with an improved locking arrangement in the pressure cooker to prevent hazardous building up of pressure inside the container in the event of improper closing of the cover.

It is further object of the invention to provide an effective, easy and convenient means of pressure seal for pressure cooker cover and container.

This cooking system is thus absolutely metal free and made of filled or unfilled polypropylene, delrin, polycarbonate or any polymer compatible with microwave energy at a working temperature of 100-125° C.

It is yet another object of the invention to provide a removable filter means for preventing the froth from clogging/choking the primary pressure regulator means and so disposed that if this is not fitted the pressure cooker cannot build pressure within the pressure cooker.

Further object of the invention is to provide with an improved integral stop lug in the cover of the pressure cooker which prevents the overriding of the cover beyond the fully closed position when disposed on the body of the pressure cooker.

Thus, the present invention eliminates all metallic parts from the entire system and all of its sub-assemblies are made up of microwave compatible material.

According to the present invention, the microwave compatible pressure cooker is a combination of a pressure cooker and a microwave compatible appliance. This microwave pressure cooker is made-up of microwave compatible material like polypropylene with the use of silicone for sealing and safety devices.

In this present invention, the pressure cooker for a microwave oven works on the principle of normal pressure cooking like in a conventional cooker used on a gas stove so that the cooking time is less compared to time taken by non pressure cooking inside the microwave oven.

According to the present invention, the microwave compatible pressure cooker has specially designed safety devices like pressure regulating valve, secondary safety devices and a gasket offset device. All these are made with microwave compatible materials which facilitates in using this Microwave Compatible Pressure Cooker inside the microwave oven.

BRIEF DESCRIPTION OF THE DRAWINGS

The invention will be more fully described with reference to the accompanying drawings wherein.

DETAILED DESCRIPTION

Figure 1:
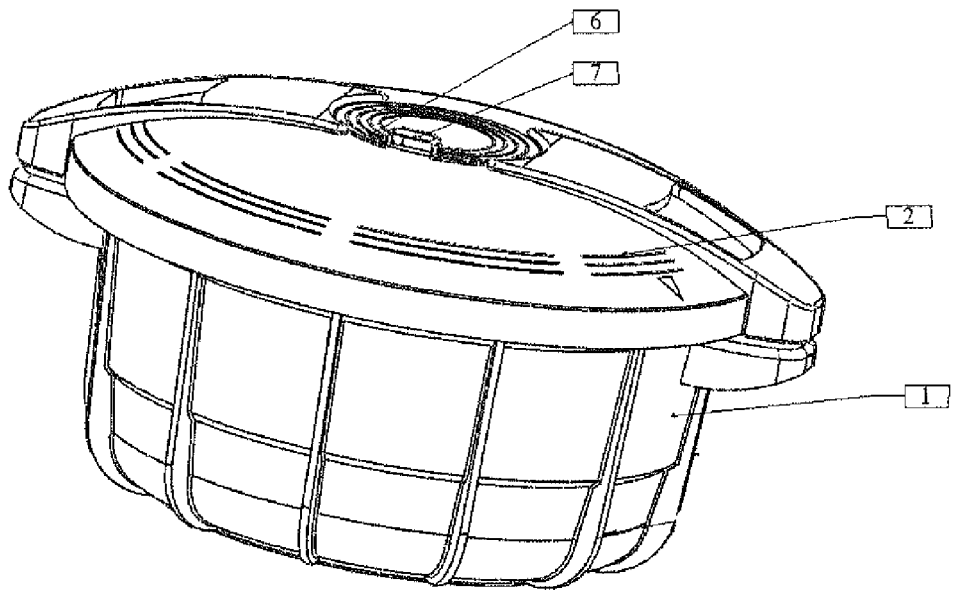
FIG. 1 depicts the top and side view of the container (1) assembled with cover (2).

FIG. 1 illustrates the essential features of the design exterior of the cooker container (1). The crucial elements are the ribs projecting from the surface in a designed pattern for facilitating grip and to improve necessary mechanical strength. The material of the container (1) and cover (2) can be unfilled or filled polypropylene, delrin, polycarbonate or any polymer compatible with microwave energy without deterioration of properties and which can give satisfactory mechanical performance at a working temperature of 125° C. with food.

The cover (2) incorporates a band which merges with the opening/closing aid. The unique top cover (2) is further strengthened with annular grooves and is also provided with projecting ribs along its inner surface to improve necessary mechanical strength.

The cover (2) has unique feature wherein the froth or vapour is collected in a receptacle. The receptacle has a top cover (6) and a lip (7).

Figure 2:
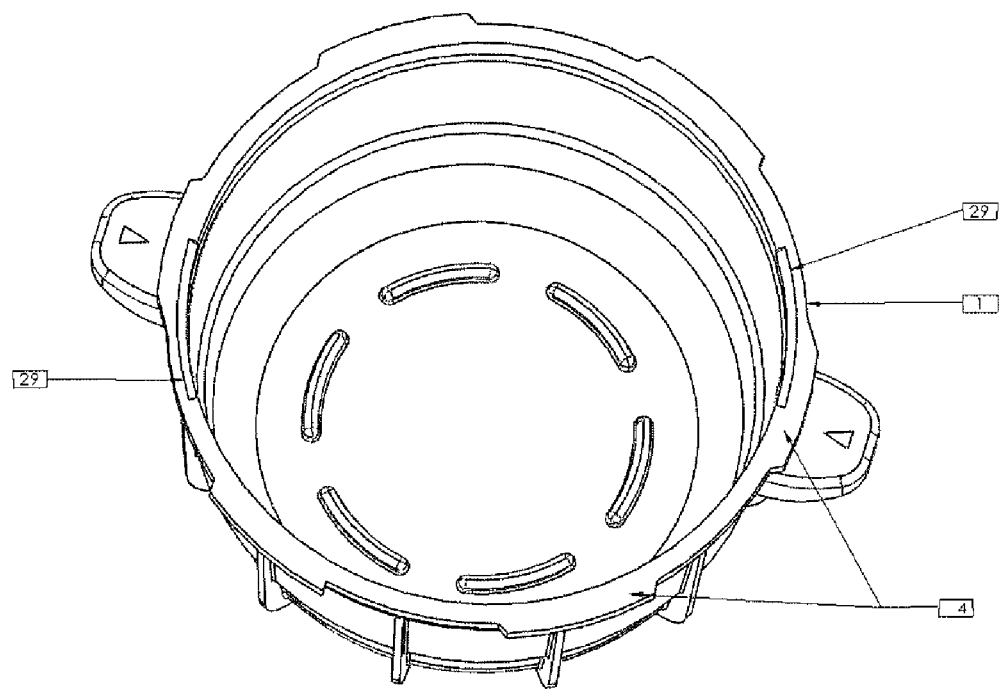
FIG. 2 depicts the inside view of the container (1).

FIG. 2 illustrates the design of the smooth inner surface of the container (1) which permits easy removal of cooked material and subsequent easy cleaning of the container (1) without leaving any residue, of cooked food. The rim of the said container (1) has locking lugs (4) to engage with the cover (2).

Figure 3A:
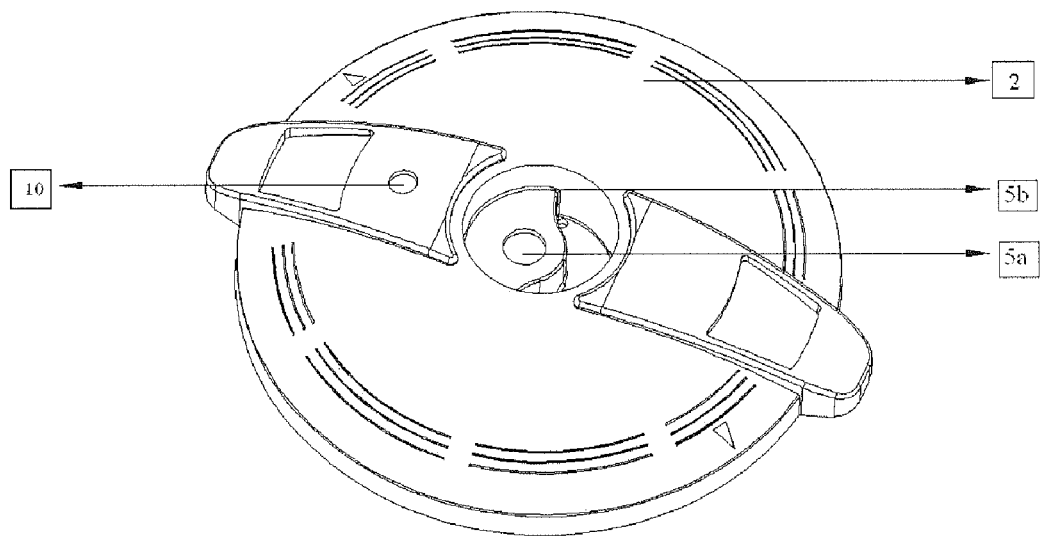
FIG. 3(a), 3(b) depicts the top surface of the cover (2) showing the recessed integral receptacle for trapping any foam ejected from the inside.
Figure 3B:
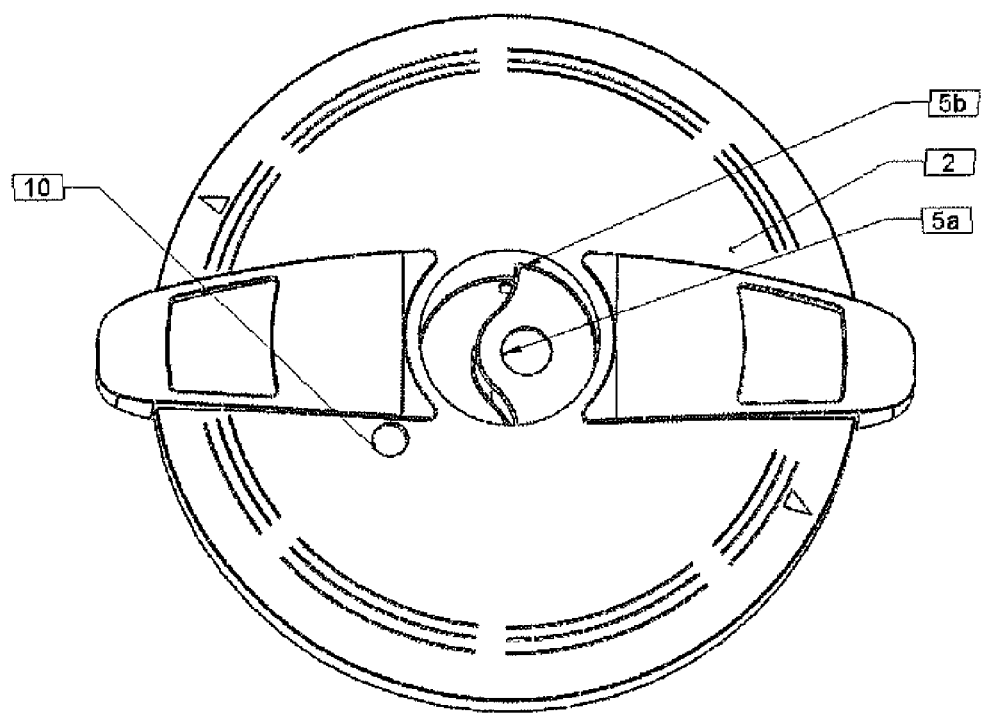

FIG. 3(a), 3(b) show the recessed integral receptacle (5b) in the top of the cover (2). This receptacle is intended to trap any foam ejected from inside through the primary pressure regulator means (8). As visible in the illustration of FIGS. 3(a) and 3(b) the secondary regulator means (10) may be disposed on any portion of the cover (2) and is not restricted only to the positions illustrated in accompanying drawings with this application. The position may be on any portion of the cover but spaced away from the primary regulator.

As per the invention, there are two hole type regulator opening means (5a, 10) provided on the cover (2) into which diaphragm type pressure regulator means is removably disposed.

Figure 13:
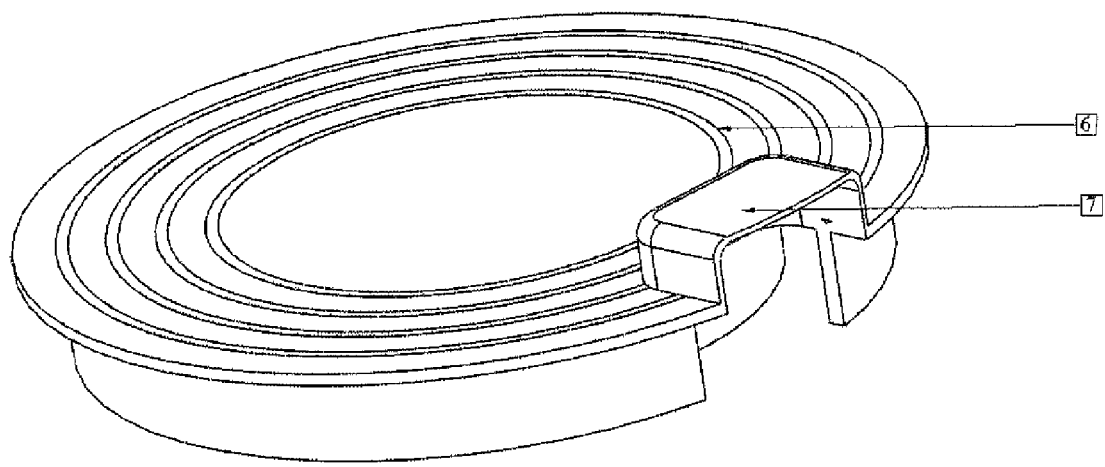
FIG. 13 depicts the receptacle cover (6) and a lip (7) which is intended for closing the recessed integral receptacle in the top of the cover (2)

The cover (2) of the microwave pressure cooker as per the invention shall have a receptacle type regulator opening means (5b) which has an open annular cylindrical length of enclosed receptacle body formed underneath the cover (2) as vapour striking volume and formed integral with the cover (2). The said receptacle body has a generally circular opening (5a) or a cutout at its bottom adapted for removably disposing the diaphragm type pressure regulator means (8), thereby forming an open cavity arrangement. This cavity is adapted to be closed by the receptacle cover (6) provided with a lip (7) or a protrusion at the peripheral top edge so as to form an opening in the said cavity arrangement. This is illustrated in FIG. 13.

Figure 4:
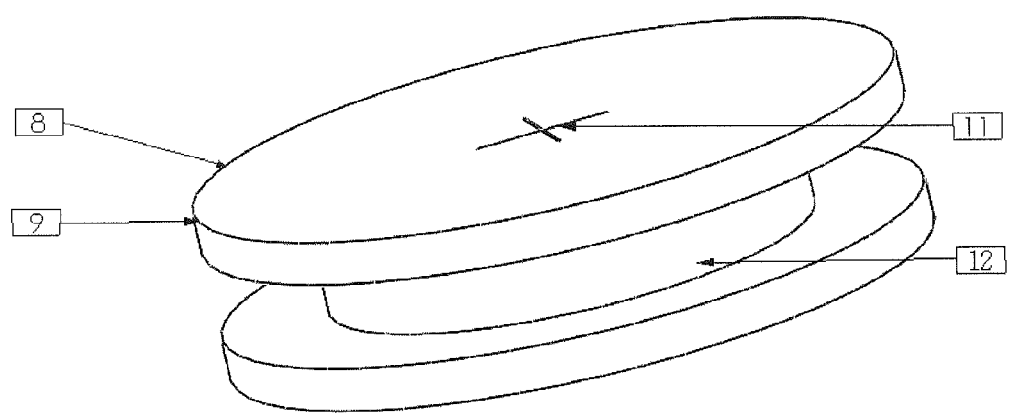
FIG. 4 depicts the elastomeric pressure regulator having a slit (11).

FIG. 4 shows the primary pressure regulator means (8) with a flat disc shaped pressure responsive member (12), which is removably disposed in the hole (5a) of the receptacle type regulator opening means (5b) formed on the cover (2) of the cooker. The said primary pressure regulator means (8) has a pressure responsive diaphragm (9), characterized in the non-metallic deformable microwave permeable diaphragm type pressure regulator means. The diaphragm (9) has a slit (11) which responds when encountering a pressure increase within the container to change the slit (11) into an open configuration responsive to pressure development within the closed cooker enclosure.

FIGS. 5, 10, 11 and 12 illustrates the secondary elastomeric pressure regulator means. The material of the primary and secondary pressure regulator can be silicon rubber, fluoro elastomer, or any other elastomer which can stand a working temperature of 125° C. and which is compatible with microwave energy without deterioration of properties.

Figure 5:
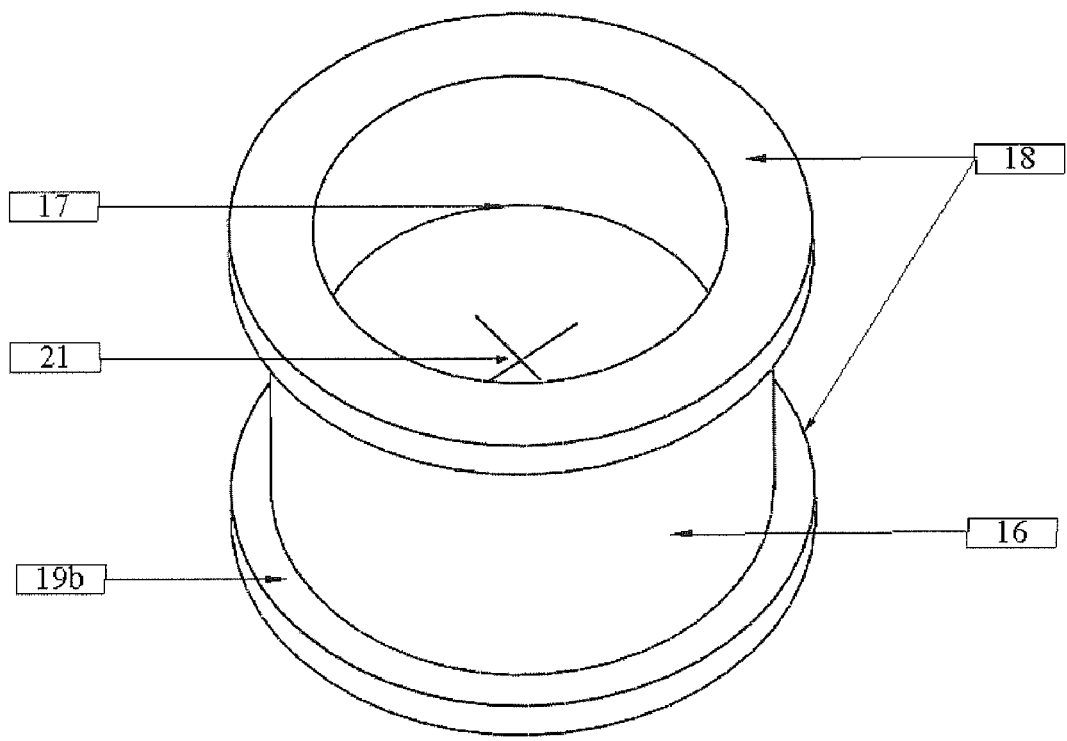
FIG. 5 depicts the elastomeric visual pressure indicator-cum over pressure relief device with slit in H-shape of symmetric design.

FIG. 5 shows the elastomeric pressure regulator means (19b) which has a non-metallic deformable 'H' shaped body (16) formed with a flat central circular diaphragm (17) in the mid portion of the tubular cylinder body, with two extreme upper and bottom circular edge type flanges (18) forming outwardly extending lip. The flat central circular diaphragm has a slit (21). This regulator is unique in the sense that it can be disposed on the cover in either direction.

Figure 10:
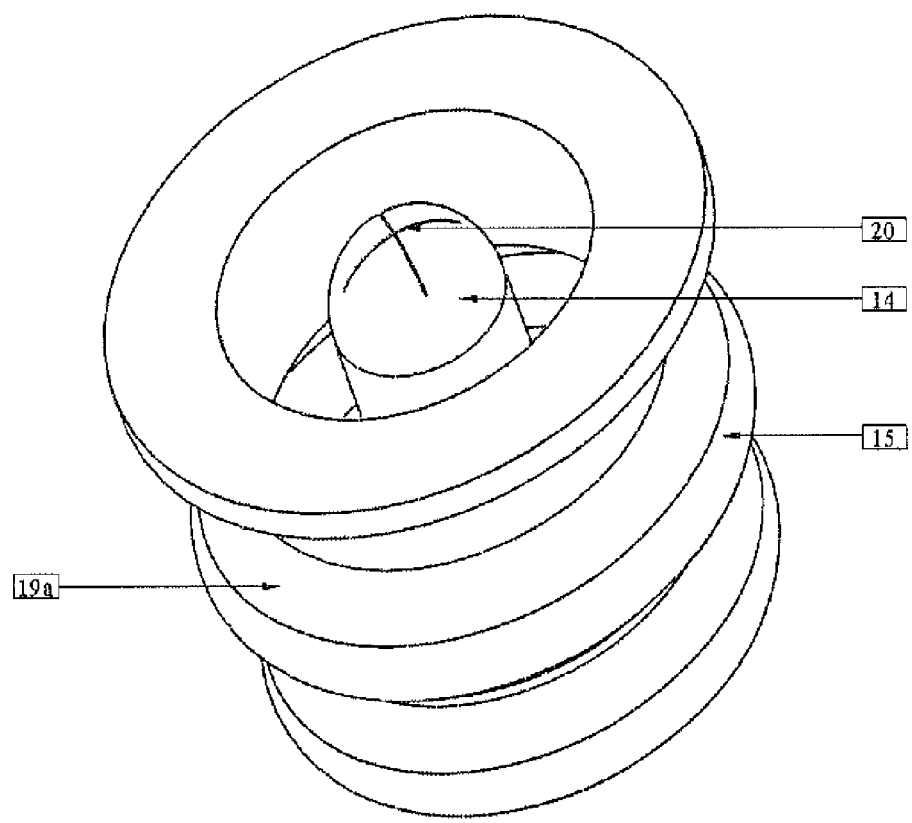
FIG. 10 depicts the elastomeric visual pressure indicator-cum over pressure relief device with slit in H-shape of symmetric design.

FIG. 10 shows the elastomeric secondary integral indicator cum pressure regulator means (19a) which has a non-metallic non-deformable core (14) projecting from the bottom of a pressure responsive elastically deformable type casing (15). The said core (14) has a slit (20) formed therein at its distal tip in closed configuration, such that the slit (20) changing to open configuration under the effect of pressure applied on the casing, disposed within the closed cooker enclosure.

Figure 11:
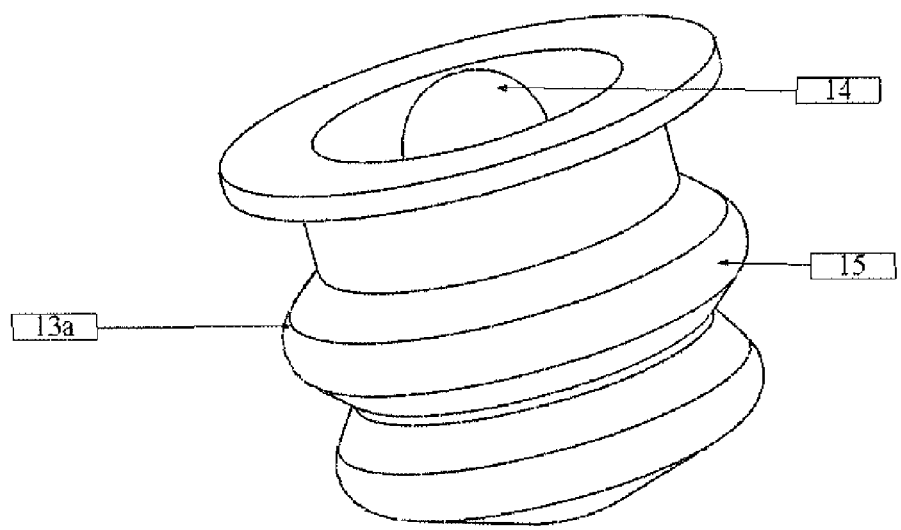
FIG. 11 depicts the elastomeric visual pressure indicator-cum-over pressure relief device without slit in H-shape of symmetric design.

FIG. 11 shows the elastomeric secondary integral indicator cum pressure regulator means (13a) which has a non-metallic non-deformable core (14) projecting from the bottom of a pressure responsive elastically deformable type casing (15). This pressure regulator is designed without a slit.

Figure 12:
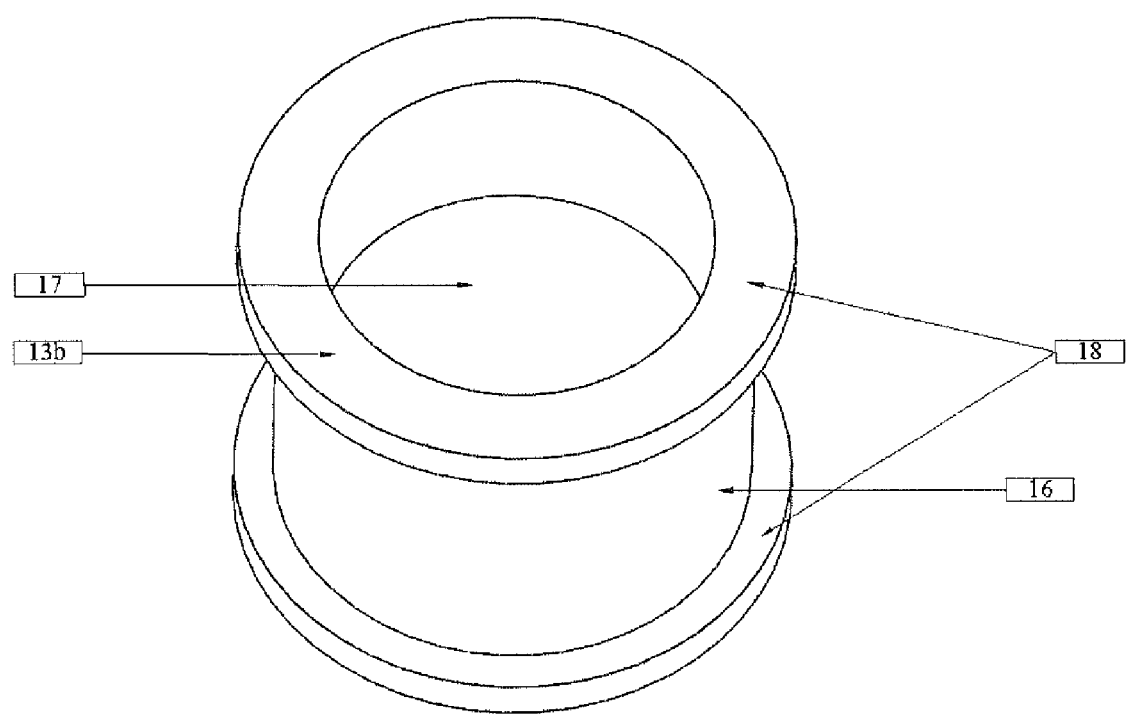
FIG. 12 depicts the elastomeric visual pressure indicator device with flat central circular diaphragm (17).

FIG. 12 shows the elastomeric secondary pressure indicator cum regulator means (13b) which has a non-metallic deformable 'H' shaped body (16) formed with a flat central circular diaphragm (17) in the mid portion of the tubular cylinder body, with two extreme upper and bottom circular edge type flanges (18) forming outwardly extending lip. This pressure regulator is also designed without a slit. This regulator is unique in the sense that it can be disposed on the cover in either direction.

Figure 6:
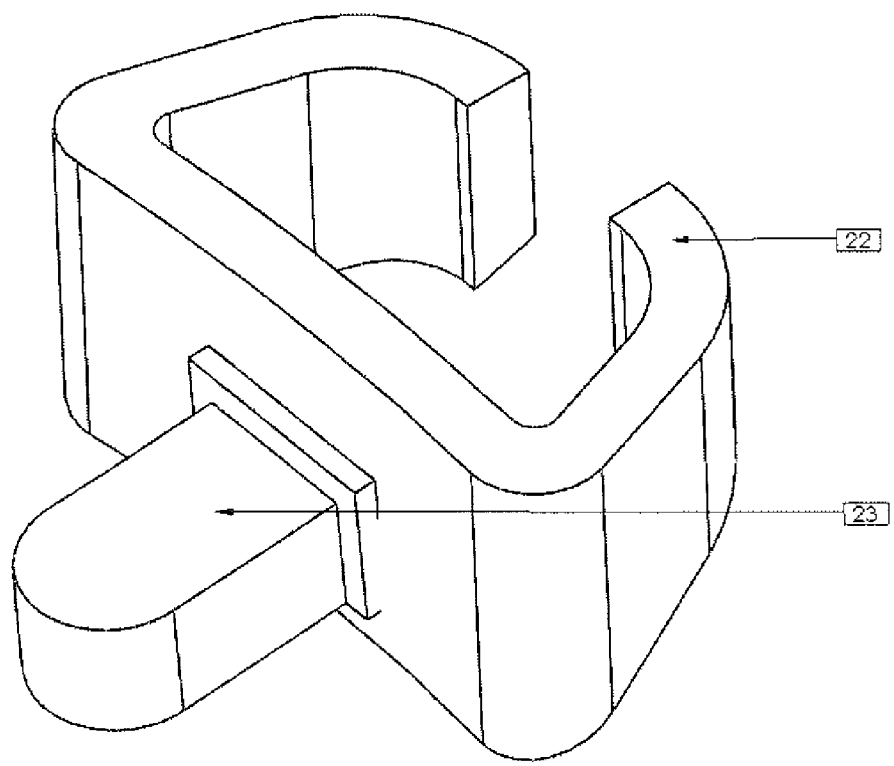
FIG. 6 depicts the push rod of gasket offset device.

FIG. 6 depicts the free sliding push rod (23) of gasket offset device (22). The free sliding push rod (23) and the gasket offset device (22) is generally made up of microwave permeable material.

Figure 7:
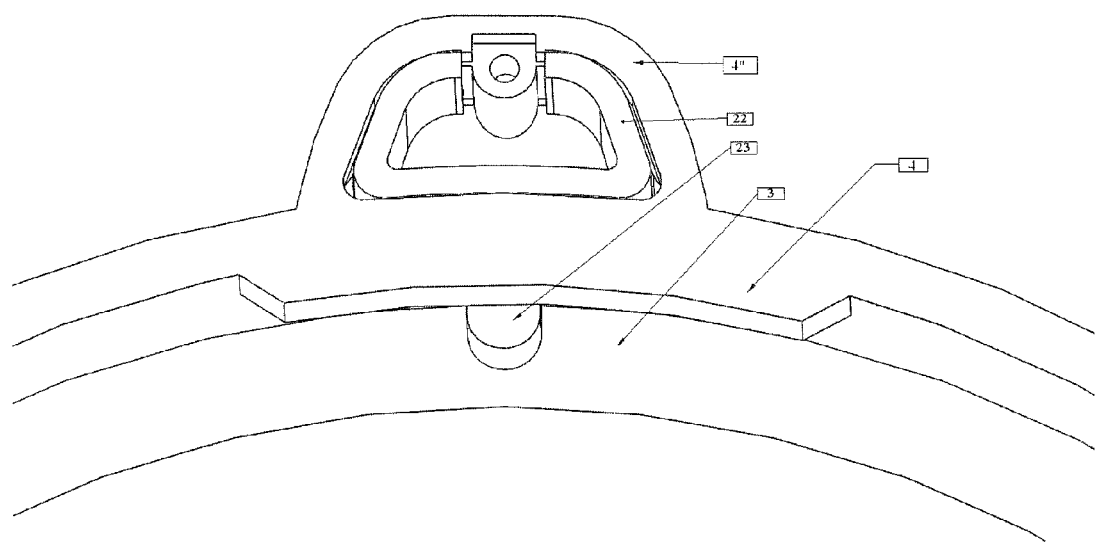
FIG. 7 depicts the gasket offset device sub assembly fitted in the cover (2) which works in conjunction with the container lugs to prevent pressure build up unless the cooker is properly closed as designed.

FIG. 7 depicts the gasket offset device sub assembly fitted in the cover (2) which shows the cover gasket (3), disposed on the cover rim. The said gasket offset assembly works in conjunction with the container lugs to prevent pressure build up unless the cooker is properly closed as designed.

Figure 8:
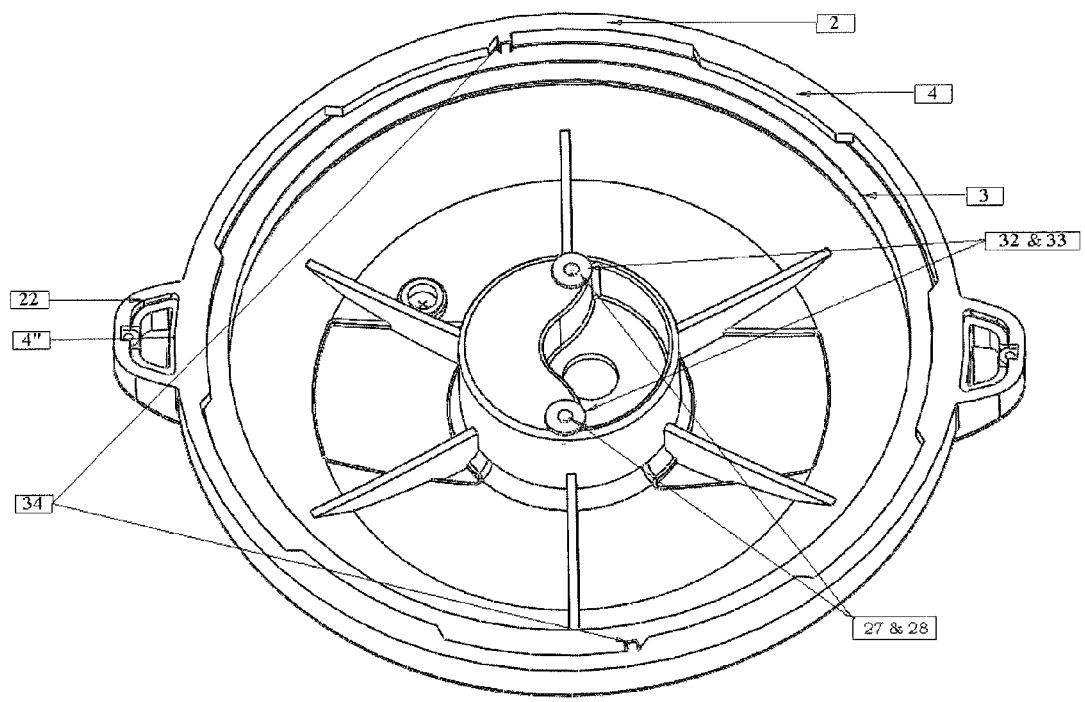
FIG. 8 depicts the inner surface of the cover (2) wherein the gasket (3) is fitted to the cover (2) along with locking lugs (4) and gasket offset device.

FIG. 8 depicts the inner surface of the cover (2) wherein the gasket (3) is fitted to the cover (2) along with locking lugs (4), opening/closing aid (4") and gasket offset device (22).

Figure 14:
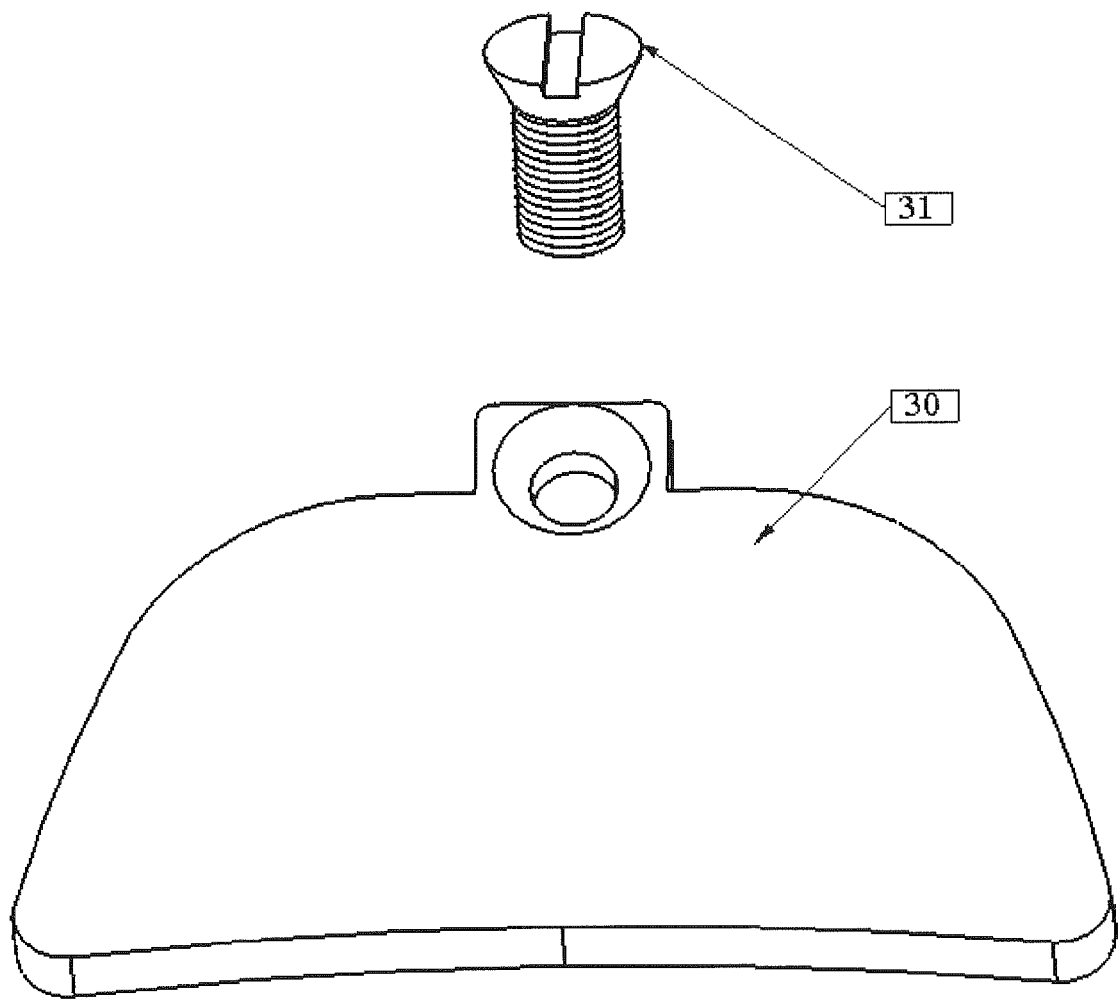
FIG. 14 illustrates the detachable gasket offset device cover (30) with the fixing means (31).

FIG. 14 illustrates the detachable gasket offset device (30) adapted for fitting with the fixing means (31) and are generally made up of microwave permeable material.

Figure 9:
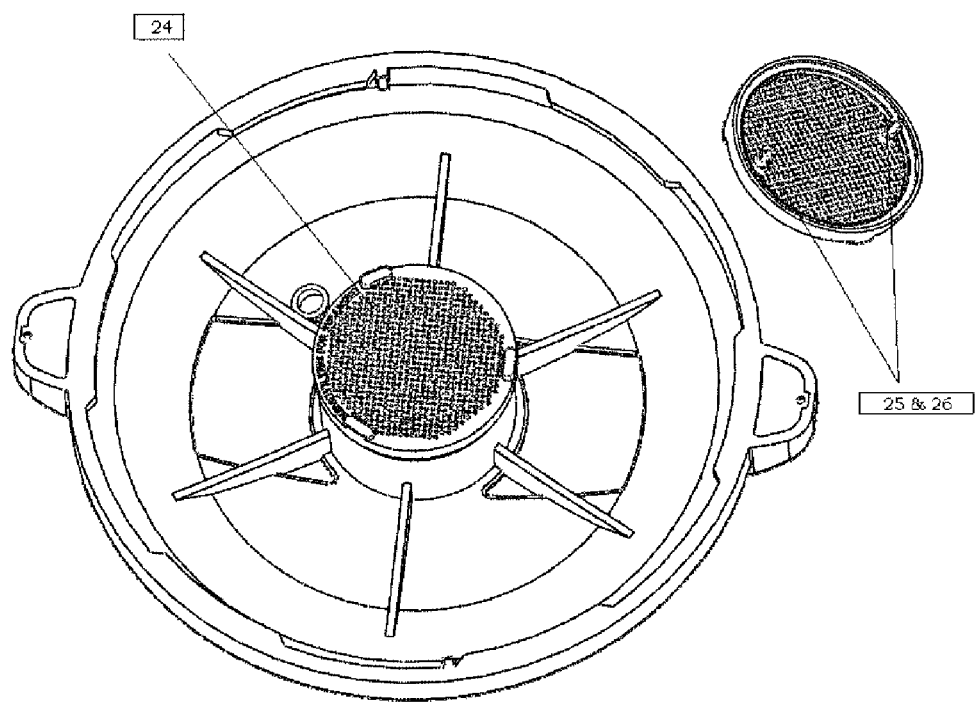
FIG. 9 depicts the inner side of the cover (2) which has receptacle opening means (5a, 5b) of the cover (2) which further includes perforated material (24) underneath the cover.

FIG. 9 illustrates the inner side of the cover (2) which has the first regulator opening means (5b with 5a) which further includes a filter (24)) which is generally made up of microwave permeable material and comprises of atleast a perforated material underneath the cover, covering the hole (5b) by means of perpendicular pin (25, 26). Each pin is removably positioned within a hole (27, 28) shown in FIG. 8 and each hole is provided with a grommet (32, 33) shown in FIG. 15 which is adapted to receive the perpendicular pin (25, 26) into the hole fittingly.

Figure 15:
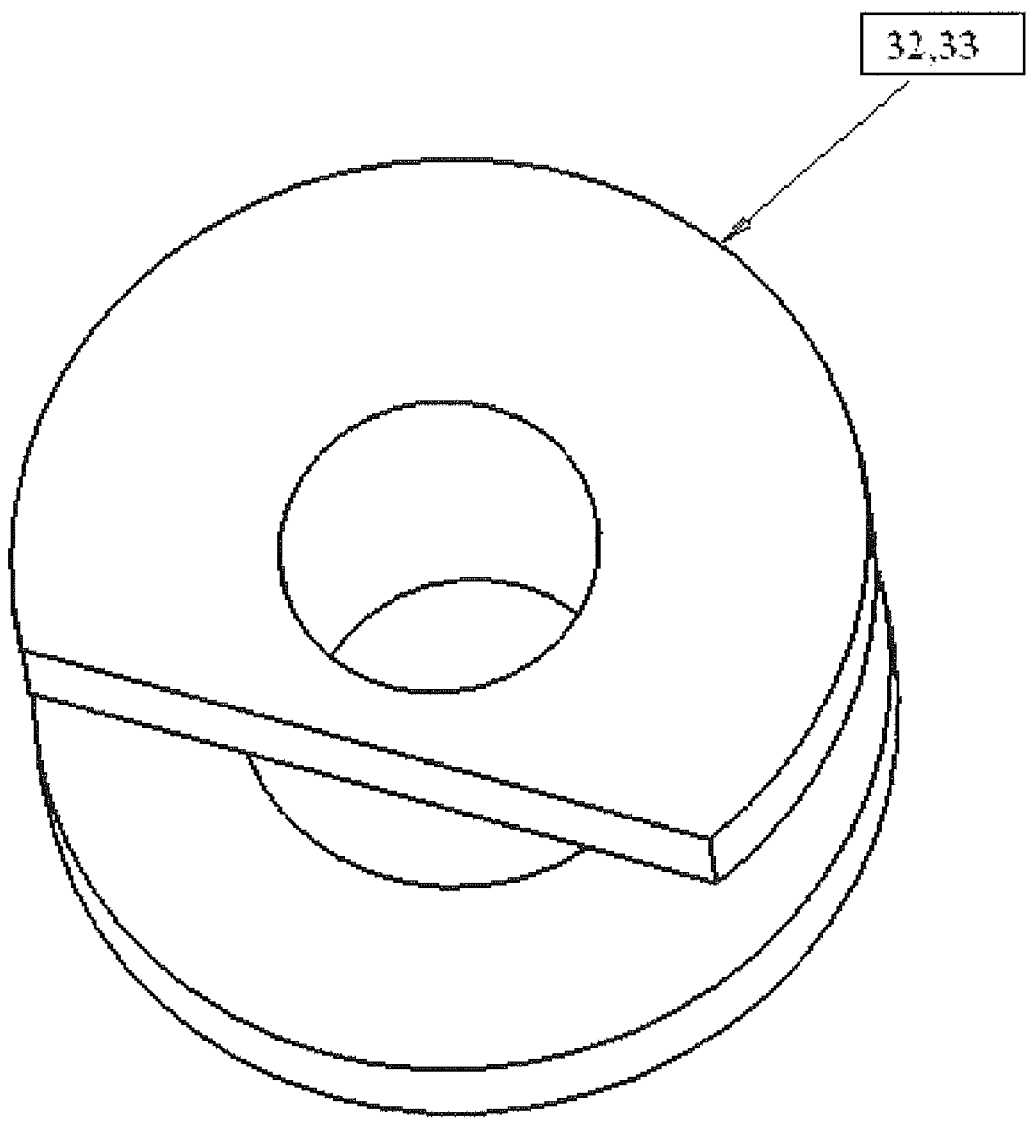
FIG. 15 depicts the grommet (32, 33) which is disposed within the holes (27 and 28).

FIG. 15 illustrates the shape of the grommet (32, 33) which is generally made up of microwave permeable material, and is disposed in a manner such that the cylindrical portion is well within the holes (27, 28) and having circular flanges at either end to spread around the hole to form a locking collar at either end and is adapted to receive the perpendicular pin (25, 26) therein within.

FIG. 13 shows the receptacle cover (6) and a lip (7) which is intended for closing the recessed integral receptacle in the top of the cover (2).

The present invention relates to a microwave pressure cooker consisting of a container (1) and a cover (2). The cover with a gasket (3) is adapted for ledge interlock type sealing and lug locking engagement with the said container (1) to form an enclosure for microwave pressure cooking.

The container (1) of the cooker has ribs formed on the outer surface to facilitate grip and easy handling. These ribs act as thermal offset which minimize the heat felt when the cooker is taken out of the microwave oven after cooking and also provide mechanical strength to the cooker. Further, the bottom of the container (1) also has ribs to ensure strength and stability. The rim of the container is provided with a pair of chamfer and lugs (4) aiding to lock the container and the cover.

The cover (2) is incorporated with a band which merges with a pair of opening/closing aid (4") that coincides with the chamfer of the container. The cover is further strengthened with annular grooves. The cover (2) has a unique feature wherein the froth or vapour produced during cooking is collected in a receptacle. The receptacle has a top cover (6) and a lip (7).

The inner surface of the cover (2) has matching locking lugs (4) along the rim cooperating with the lugs of the container (1). The flexible deformable lug gasket is mounted along the wall of locking lug of the cover. The said cover gasket (3) is generally V shaped in cross section. The said container (1) is further adapted for additional interlock with the cover (2) with the pair of chamfer formed on two portions diametrically opposite on the inner rim of the container top edge, each of the chamfer portion corresponding to the span of the movable pushrod (23) of the gasket offset device (22).

The material of the container (1) and the cover (2) can be unfilled or filled polypropylene, delrin, polycarbonate or any polymer compatible with microwave energy without deterioration of properties and can give satisfactory mechanical performance at a working temperature of 125° C. with food.

The uniqueness of this invention lies on the characteristics of the various pressure regulator means and gasket offset device disposed on the cover.

This microwave compatible pressure cooker has specially designed safety devices like primary pressure regulating means (8), secondary pressure indicator cum regulator means (13a, 13b 19a, 19b) and a gasket offset device (22). All these are made with non-metallic deformable, microwave compatible materials.

The cover comprises of a first and a second regulator opening means (5b with 5a and 10) forming valve openings for disposing various pressure regulator means which can operate at different thresholds.

The first receptacle type regulator opening means (5b) is an open annular cylindrical length of enclosed receptacle body formed underneath the cover (2) for collecting the discharge vapour of a predetermined volume. The said enclosed receptacle body is embedded with the cover (2). The said receptacle body has a circular opening (5a) or a cutout at its bottom adapted for removably disposing the primary diaphragm type pressure regulator means (8), thereby forming a open cavity arrangement. This cavity is adapted to be closed by the receptacle cover (6) provided with a lip (7) or a protrusion at the peripheral top edge so as to form an opening in the said cavity arrangement. The receptacle cover (6) has a smooth dome like structure in its inner surface for deflecting the steam ejecting from the open slit (11) of the pressure regulator radially around and within the receptacle cavity arrangement. Further, the receptacle cover (6) shall have at least one cone type projection in its inner surface for deflecting the steam radially and uniformly into the receptacle cavity arrangement.

The said primary pressure regulating means (8) consists of a pressure responsive diaphragm (9) having a slit (11) and a flat disc shaped pressure responsive member (12). The said flat disc portion includes an outer cooperating upwardly and downwardly extending peripheral protuberances as gripping means. This gripping means facilitates to precisely dispose the primary pressure regulating means around the regulator opening means at the opposed sides of the opening hole (5a).

When there is a pressure increase greater than the selected nominal working pressure (0.25 Kgs/sqcm) of the cooker within the cooker enclosure, the slit (11) of primary pressure regulating means (8) attains an open configuration. Alternately, when the pressure decreases below nominal working pressure, the primary pressure regulator means is adapted to reset the slit into closed configuration.

The said first regulator opening means (5b with 5a) has a filter (24) comprising of atleast a perforated material underneath the cover, covering the hole (5b) at the outside bottom of the receptacle by means of perpendicular pin (25, 26). The filter (24) is a flat circular shaped plate type perforated material held by two diametrically disposed perpendicular pin (25,26) in the corresponding holes (28 & 27) formed on the bottom surface of the receptacle type regulator opening means. Each pin is removably positioned within a hole (27, 28) and each hole is provided with a grommet (32, 33) which is adapted to receive the perpendicular pin (25, 26) and are open to atmosphere, thereby ordinarily preventing the pressure building within the enclosure for the pressure cooking until the filter (24) is mounted so as to engagingly fit the pins (25,26) into corresponding holes (28 & 27) containing the grommet (32, 33).

As per the invention, the said secondary pressure regulator shall be any one of the four types of regulator means (19b, 19a, 13a and 13b) illustrated in FIGS. 5, 10, 11 and 12 respectively. The secondary pressure regulator is removably disposed on the hole (10) formed on the cover (2).

The four types of elastomeric secondary pressure regulators mentioned above perform three distinct functions:
1) They act as a visual pressure indicator, indicating the pressure inside the cooker.
2) They also act as a safety device which releases the excess pressure
   (a) when there is an excess pressure of around 0.5 kg/sqcm which is more than the operating pressure around 0.25 Kgs/sqcm.
   (b) or in case of pressure regulator failing to operate for various reasons;
3) They also act as blow off device in case of excess pressure accumulation.

Among the four types of secondary pressure indicator cum regulator means 19a and 19b are designed with slits to release pressure, whereas 13a and 13b are designed without slits to act at different levels of operating thresholds.

The secondary pressure indicator cum regulator means 13b (FIG. 12) and 19b (FIG. 5) are elastomeric pressure regulator which have a non-metallic deformable 'H' shaped body (16) formed with a flat central circular diaphragm (17) in the mid portion of the tubular cylinder body. The tubular cylindrical body has two extreme upper and bottom circular edge type flanges (18) forming outwardly extending lip. The protruding edge of the said lip sits on the hole of the pressure regulator opening means (10) formed on the cover (2) of the cooker. They are designed symmetrically and hence unique in the sense that it can be disposed on the cover in either direction.

The central flat circular diaphragm (17) in the secondary pressure indicator cum regulator 19b has a slit (21) formed in the centre of the diaphragm. From closed configuration the slit (21) changes to open configuration under the effect of pressure developed inside the cooker while cooking.

The secondary pressure indicator cum regulator means 13a (FIG. 11) and 19a (FIG. 10) are designed to have elastically deformable type casing (15) with a central non-metallic non-deformable core (14) projecting from the bottom of the said casing (15).

The said core (14) in the secondary pressure indicator cum regulator 19a has a slit (20) at its distal tip. From closed configuration the slit (20) changes to open configuration under the effect of pressure developed inside the cooker while cooking.

The operating mechanism of the four types of secondary pressure indicator cum regulator means at different levels of operating threshold pressures are as follows:

The first type of secondary pressure indicator cum regulator means (13b) as illustrated in FIG. 12 has a deformable 'H' shaped tubular cylindrical structure that moves upward under increasing pressure to lift gradually the upper portion of the body. Subsequently, the central flat circular diaphragm (17) is pushed sealingly upwards and the bottom flange (18) against the underside of the cover. At first operating threshold pressure the upper portion becomes visible above the surface of the cover (2). At the second operating threshold pressure the tubular cylindrical structure gets ejected wholly from the cover (2) thereby acting as a safety device. Here the second operating threshold pressure is greater than the first operating threshold pressure.

The second type of secondary indicator cum pressure regulator means (19b) as illustrated in FIG. 5 is different from the first type wherein the central flat circular diaphragm (17) has slit (21). This secondary indicator cum pressure regulator means (19b) has a deformable 'H' shaped tubular cylindrical structure that moves upward under increasing pressure to lift gradually the upper portion of the body. Subsequently, the central flat circular diaphragm (17) is pushed sealingly upwards and the bottom flange (18) against the underside of the cover. At first operating threshold pressure the upper portion becomes visible above the surface of the cover (2). At intermediate operating threshold pressure the slit (21) of the central flat circular diaphragm (17) changes to open configuration thereby forming a path for fluid from interior to exterior of the cooker. At the second operating threshold pressure the tubular cylindrical structure gets ejected wholly from the cover (2) thereby acting as a safety device. Here the intermediate operating threshold pressure is greater than first threshold pressure and second operating threshold pressure is greater than intermediate operating threshold pressure.

The third type of secondary pressure indicator cum regulator means (13a) as illustrated in FIG. 11 has a elastically deformable type casing (15) that deforms under increasing pressure to compress gradually towards the underside of the cover (2). Subsequently free end of the core (14) becomes visible above the surface of the cover (2) indicating the pressure increase inside the container. At first operating threshold pressure the free end of the core (14) becomes visible above the surface of the cover (2). At the second operating threshold pressure the casing gets ejected wholly from the cover (2) thereby acting as a safety device. Here the second operating threshold pressure is greater than the first operating threshold pressure.

The fourth type of secondary indicator cum pressure regulator means (19a) as illustrated in FIG. 10 is different from the third type wherein the core (14) has a slit (20) at its distal tip. This secondary indicator cum pressure regulator means (19a) has a elastically deformable type casing (15) that deforms under increasing pressure to compress gradually towards the underside of the cover (2). Subsequently free end of the core (14) becomes visible above the surface of the cover (2) indicating the pressure increase inside the container. At first operating threshold pressure the free end of the core (14) becomes visible above the surface of the cover (2). At intermediate operating threshold pressure the slit (20) of the core (14) changes to open configuration thereby forming a path for fluid from interior to exterior of the cooker. At the second operating threshold pressure the casing gets ejected wholly from the cover (2) thereby acting as a safety device. Here the intermediate operating threshold pressure is greater than first threshold pressure and second operating threshold pressure is greater than intermediate operating threshold pressure.

According to the invention, the said secondary pressure regulator means (19a, 19b) are adapted to either reset or auto-reset the slit into close configuration responsive to pressure decrease below the intermediate operating threshold pressure. The said secondary pressure regulator means (13a, 13b, 19a, and 19b) are adapted to retract or auto-retract into original mounting position responsive to the pressure decrease within the closed cooker enclosure from the first threshold pressure to equal or below the ambient pressure.

According to the present invention, the gasket offset device (22) is also an additional secondary safety device. This safety Gasket Offset Device (GOD) is made out of plastic and silicone which pushes in the gasket (3) and does not allow pressure to build up inside the container (1), if the cover (2) is not fitted or closed properly. This device is called the gasket offset device.

The said gasket offset means shall comprise of a flexible deformable lug gasket mounted along the wall of locking lug (4) of the cover (2). There is an opening with a pathway provided in the cover (2) between the interior of said cover (2) and interior of opening/closing aid (4"). A free sliding push rod is disposed in the said pathway of the said opening of the cover (2) extending partially into the interior of the cover (2) and into said interior of said opening/closing aid (4") and supportingly abutted against the said lug gasket, providing a fluid path between the interior and exterior of the cover (2) and enclosure. The free sliding push rod is adapted to contact the cover gasket (3) when the cover is moved for a sealing engagement with the container (1). This movement slidably and completely moves the push rod into the interior of the locking lug (4) and closes the fluid path with the cover gasket (3) between the interior and exterior of the enclosure, only when the cover gasket (3) is fully disposed on the cover rim. Further the gasket offset means has a detachable gasket offset device cover (30) fixable in position with a screw type fixing means (31).

The actual dimensions of various parts of the present invention described here and depicted in the figures are designed to have appropriate various values to achieve the different intended purpose of the concerned part.

Now the invention has been described to the best of our ability and knowledge and any modification, variation and deviation would come within the purview of this invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A microwave pressure cooker formed with a container open at its top comprising the following:
   (a) a cover with a gasket adapted for ledge interlock type sealing and lug locking engagement with said container to form an enclosure for pressure cooking with the container;
   (b) a first and a second regulator opening means forming valve openings through said cover;
   (c) a primary deformable diaphragm type pressure regulator means with slits formed therein adapted to be disposed on the first regulator opening means, and which is responsive to the pressure in the enclosure;

(d) a secondary deformable pressure indicator cum regulator means adapted to be disposed on the second regulator opening means formed on the cover and which is responsive to pressure in the enclosure;

(e) a push rod type gasket offset device means mounted on locking lug and an opening and closing aid of cover for releasably maintaining said container and the cover in said sealing engagement responsive to disposition of gasket on the cover and the movement of said gasketed cover relative to said container to a lock position; and (f) a filter adapted to be disposed removably on the first regulator opening means, wherein said primary pressure regulator means is a pressure responsive diaphragm, characterized in the non-metallic deformable microwave permeable diaphragm type pressure regulator means, the diaphragm adapted to be disposed on the cover of the cooker, said diaphragm having a slit made thereon and which diaphragm responds when encountering a pressure increase within the container to change the slit into an open configuration responsive to pressure development within the closed cooker enclosure, when the pressure is greater than a selected nominal working pressure of the cooker, said diaphragm further characterized in that it is generally a flat disc shaped pressure responsive member, adapted to be disposed in the hole of the receptacle type regulator opening means formed on the cover of the cooker, said disc portion including an outer cooperating upwardly and downwardly extending peripheral protuberances as gripping means that engage fittingly a portion around the regulator opening means at the opposed sides of the opening hole respectively.

2. The microwave pressure cooker as claimed in claim 1 wherein said secondary pressure indicator cum regulator means is a pressure responsive type body characterized in the non-metallic deformable 'H' shaped body formed with a flat central circular diaphragm in the tubular cylinder body in the mid portion of said body having a plurality of operating thresholds, the regulator being of the type comprising of the body with two extreme upper and bottom circular edge type flanges forming outwardly extending lip, which protruding edge sits on the hole of the pressure regulator opening means formed on the cover of the cooker and substantial portion hanging freely underneath the cover, characterized in that the tubular cylinder body moves upward under increasing pressure to lift gradually the upper portion of the body towards the underside of the cover, thereby pushing sealingly the central flat circular diaphragm up and the bottom flange against the underside of the cover such that the upper portion is visible above the surface of the cover, under the effect of the pressure applied on the body disposed within the closed cooker enclosure, when operating at first operating threshold and ejecting wholly from the cover under the effect of the pressure applied on the body disposed within the closed cooker enclosure when operating at second operating threshold, wherein second operating threshold pressure is greater than the first operating threshold pressure.

3. The microwave pressure cooker as claimed in claim 1 wherein said secondary pressure regulator valve cum indicator means is a pressure responsive type characterized in the non-metallic deformable 'H' shaped body formed with a flat central circular diaphragm in the tubular cylinder body in the mid portion of the body having operating thresholds, the regulator being of the type comprising of the body with two extreme upper and bottom circular edge type flanges forming outwardly extending lip, which protruding edge sits on the hole of the pressure regulator opening means formed on the cover of the cooker, and substantial portion hanging freely underneath the cover, characterized in that the tubular cylinder body moves upward under increasing pressure to lift gradually the upper portion of the body towards the underside of the cover, thereby pushing sealingly the central flat circular diaphragm up and the bottom flange against the under side of the cover such that the upper portion is visible above the surface of the cover, under the effect of the pressure applied on the body disposed within the closed cooker enclosure when operating at first operating threshold and the central flat circular diaphragm adapted further to have a slit formed in the centre of the diaphragm in closed configuration, such that the slit changing to open configuration under the effect of pressure applied on the body disposed within the closed cooker enclosure, thereby forming a path for fluid from interior to exterior of the cooker when operating at intermediate operating threshold, and ejecting wholly from the cover under the effect of pressure applied on the body when operating at second operating threshold, wherein said intermediate operating threshold pressure is greater than first threshold pressure and second operating threshold pressure is greater than intermediate operating threshold pressure.

4. The microwave pressure cooker as claimed in claim 1 wherein said secondary pressure indicator cum regulator means is a pressure responsive type casing characterized in the non-metallic non-deformable core projecting from the bottom of an elastically deformable casing and surrounded by the casing, having plurality of operating thresholds, the regulator being of the type comprising of the casing fixed to the cover of the cooker, substantially disposed in the hole of the regulator opening means, generally underneath the cover, with the free end of the core flush with the surface of the cover, characterized in that the casing is deformed under increasing pressure to compress gradually the casing towards the underside of the cover, thereby pushing upwardly the core for visibility of the free end of the core above the surface of the cover, under the effect of the pressure applied on the casing, disposed within the closed cooker enclosure, when applied pressure is greater than a first operating threshold and further adapted for ejecting wholly from the cover under the effect of further higher pressure applied on casing disposed within the closed cooker enclosure when applied pressure is greater than a second operating threshold, wherein second threshold pressure is greater than the first threshold pressure.

5. The microwave pressure cooker as claimed in claim 1 wherein said secondary pressure indicator cum regulator valve means is a pressure responsive type casing characterized in the non-metallic non-deformable core projecting from the bottom of an elastically deformable casing and surrounded by the casing, having operating thresholds, the regulator being of the type comprising of the casing fixed to the cover of the cooker, substantially disposed in the hole of regulator opening means fully underneath the cover, with the free end of the core flush with the surface of the cover, characterized in that the casing is deformed under increasing pressure to compress gradually the casing towards the underside of the cover, thereby pushing upwardly the core for visibility of the free end of the core above the surface of the cover, under the effect of the pressure applied on the casing, disposed within the closed cooker enclosure when applied pressure is greater than a first operating threshold, and the core adapted further to have a slit formed therein at its distal tip in closed configuration, such that the slit changing to open configuration under the effect of pressure applied on the casing, disposed within the closed cooker enclosure, thereby forming a path for fluid from interior to exterior of the cooker when applied pressure is greater than an intermediate operating threshold and further adapted for ejecting wholly from the cover under the effect of the further higher pressure applied on casing disposed within the closed cooker enclosure when applied pressure is greater than a second operating threshold, wherein intermediate operating threshold is greater than the first threshold pressure and second operating threshold pressure is greater than the intermediate operating threshold pressure.

6. The microwave pressure cooker as claimed in claim 1 wherein said container having locking lugs along the rim and the said cover also having matching locking lugs along the rim cooperating with the lugs of the container, the pressure regulator is said push rod type gasket offset device means for forming an offset projection on one of the said cover locking lugs cooperating with opening and closing aid, said push rod type gasket offset device means comprising:
- a flexible deformable lug gasket mounted along the wall of locking lug of the cover;
- an opening in the cover for providing a pathway between the interior of said cover and interior of opening and closing aid;
- a free sliding push rod disposed in said pathway of said opening of said cover extending partially into said interior of said cover and into said interior of said opening and closing aid and supportingly abutted against said lug gasket, providing a fluid path between the interior and exterior of the cover and enclosure, and such that adapted to contact the cover gasket as said cover is moved for a sealing engagement with said container to close the cooker, slidably moving completely into the interior of said locking lug, thereby closing the fluid path with the cover gasket between the interior and exterior of the enclosure, only when the cover gasket is fully disposed on the cover rim; and
- a detachable gasket offset device cover disposed on the locking lugs of the cover adapted for mounting the lug gasket within and disposing the movable sliding push-rod.

7. The microwave pressure cooker as claimed in claim 1 wherein said first regulator opening means is an open annular cylindrical length of enclosed receptacle body formed underneath the cover for collecting the discharge vapour of a predetermined volume and generally formed integral with the cover, said receptacle body has a generally circular opening or a cutout at its bottom adapted for removably disposing the primary diaphragm type pressure regulator means, thereby forming a open cavity arrangement.

8. The microwave pressure cooker as claimed in claim 1 wherein the first regulator opening means is a covered annular cylindrical length of enclosed receptacle body formed underneath the cover as vapour collecting and discharging volume, said means having a receptacle body with a generally circular opening or a cutout at its bottom adapted for removably disposing the primary diaphragm type pressure regulator means and including a removably affixed receptacle cover adapted for its top end forming a cavity arrangement, said receptacle cover further adapted with lip or a protrusion at the peripheral top edge so as to form an opening in the said cavity arrangement.

9. The microwave pressure cooker as claimed in claim 8 wherein the receptacle cover is a smooth dome like structure in its inner surface for deflecting the steam ejecting from the open slit of the pressure regulator radially around and within the receptacle cavity arrangement.

10. The microwave pressure cooker as claimed in claim 8 wherein the receptacle cover has at least one cone type projection in its inner surface for deflecting the steam radially and uniformly into the receptacle cavity arrangement.

11. The microwave pressure cooker as claimed in claim 1 wherein the first regulator opening means is a receptacle type regulator opening means and is such that the opening regulator means further is adapted with a filter comprising at least a perforated material covering the hole at the outside bottom of the receptacle.

12. The microwave pressure cooker as claimed in claim 11 wherein the filter is characterized in the flat circular shaped plate type perforated material having two diametrically disposed perpendicular pins each of the pins fixedly mounted generally on the peripheral edge of the flat plate and adapted to engagingly fit at its free end into corresponding holes formed on the bottom surface of the receptacle type regulator opening means for receiving said pin so as to anchor said filter from the cover, and further characterized in that said two holes are further provided with a grommet for receiving and holding the pin and are open to atmosphere, thereby ordinarily preventing the pressure building within the enclosure for the pressure cooking until the filter is mounted so as to engagingly fit the pins into corresponding holes containing the grommet.

13. The microwave pressure cooker as claimed in claim 1 wherein the second regulator opening means is a hole formed on the cover on to which the secondary regulator means is removably disposed.

14. The microwave pressure cooker as claimed in claim 1 wherein the primary pressure regulator means is further adapted to reset the slit into close configuration responsive to pressure decrease within the closed cooker enclosure below a nominal working pressure.

15. The microwave pressure cooker as claimed in claim 1 wherein the secondary pressure regulator means is further adapted to reset the slit into close configuration responsive to pressure decrease within the closed cooker enclosure below the intermediate operating threshold pressure.

16. The microwave pressure cooker as claimed in claim 15 wherein the secondary pressure regulator means is such that the slit is further adapted to auto-reset into close configuration responsive to pressure decrease within the closed cooker enclosure, below the intermediate operating threshold pressure.

17. The microwave pressure cooker as claimed in claim 1 wherein the secondary pressure regulator means is further adapted to retract into original mounting position responsive to the pressure decrease within the closed cooker enclosure from the first threshold pressure to equal or below the ambient pressure.

18. The microwave pressure cooker as claimed in claim 1 wherein the secondary pressure regulator means is further adapted to auto retract into original mounting position responsive to the pressure decrease within the closed cooker enclosure below the first threshold pressure.

19. The microwave pressure cooker as claimed in claim 1 wherein the primary pressure regulator means is such that the cylindrical half portion above the central diaphragm is identical to the cylindrical half portion below the central diaphragm.

20. The microwave pressure cooker as claimed in claim 1, wherein the container, cover, cover gasket, the primary pressure regulator means, secondary pressure indicators cum regulators, push rod type pressure regulator, filter, gasket offset device means with cover and screws grommet and receptacle type opening means are all constructed of a microwave permeable material.

21. The microwave pressure cooker as claimed in claim 1 wherein the container is provided with projecting ribs along the outer surface for facilitating grip and to improve necessary mechanical strength.

22. The microwave pressure cooker as claimed in claim 1 wherein the cover is provided with projecting ribs along its inner surface to improve necessary mechanical strength.

23. The microwave pressure cooker as claimed in claim 1, wherein the cover gasket is generally V shaped in cross section.

24. The microwave pressure cooker as claimed in claim 1, wherein said container is adapted for further interlock with cover with a pair of chamfer formed on two portions of the inner rim of the container top edge, characterized in each of the chamfer portion corresponding to the span of the two movable pushrod of the gasket offset means.

* * * * *